Sept. 27, 1966  L. W. PARMATER  3,275,932
R.P.M. DWELL ANGLE AND POINT RESISTANCE TESTER
Original Filed Aug. 26, 1960  2 Sheets-Sheet 1
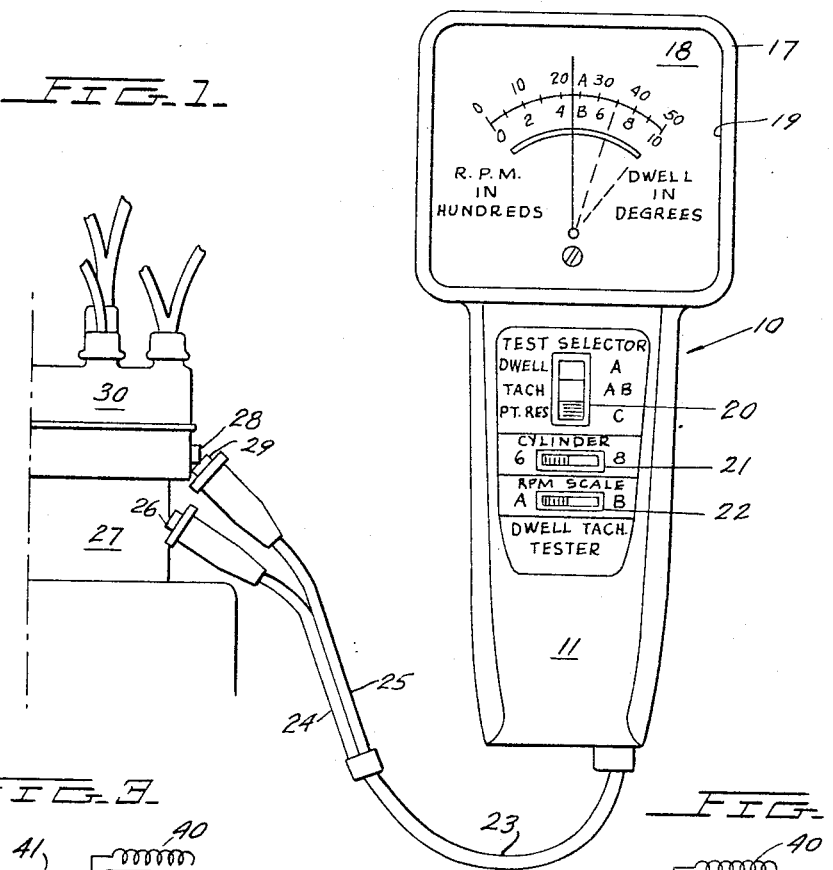
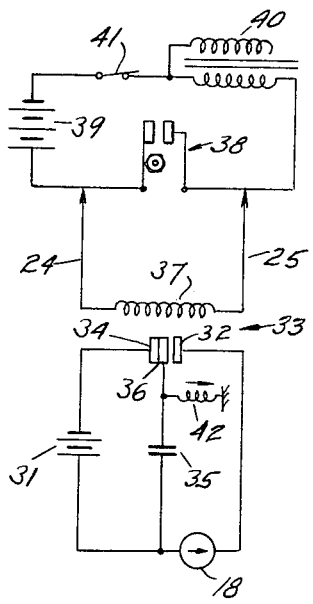
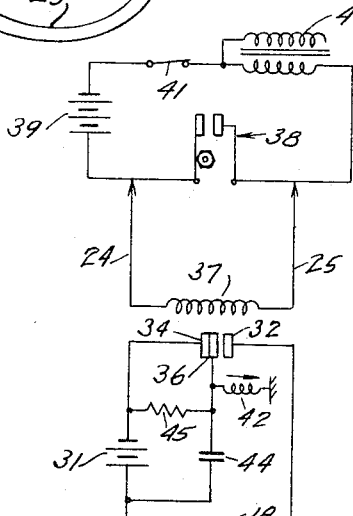
INVENTOR.
LEE W. PARMATER
BY
OSTROLENK, FABER, GERB & SOFFEN
ATTORNEYS

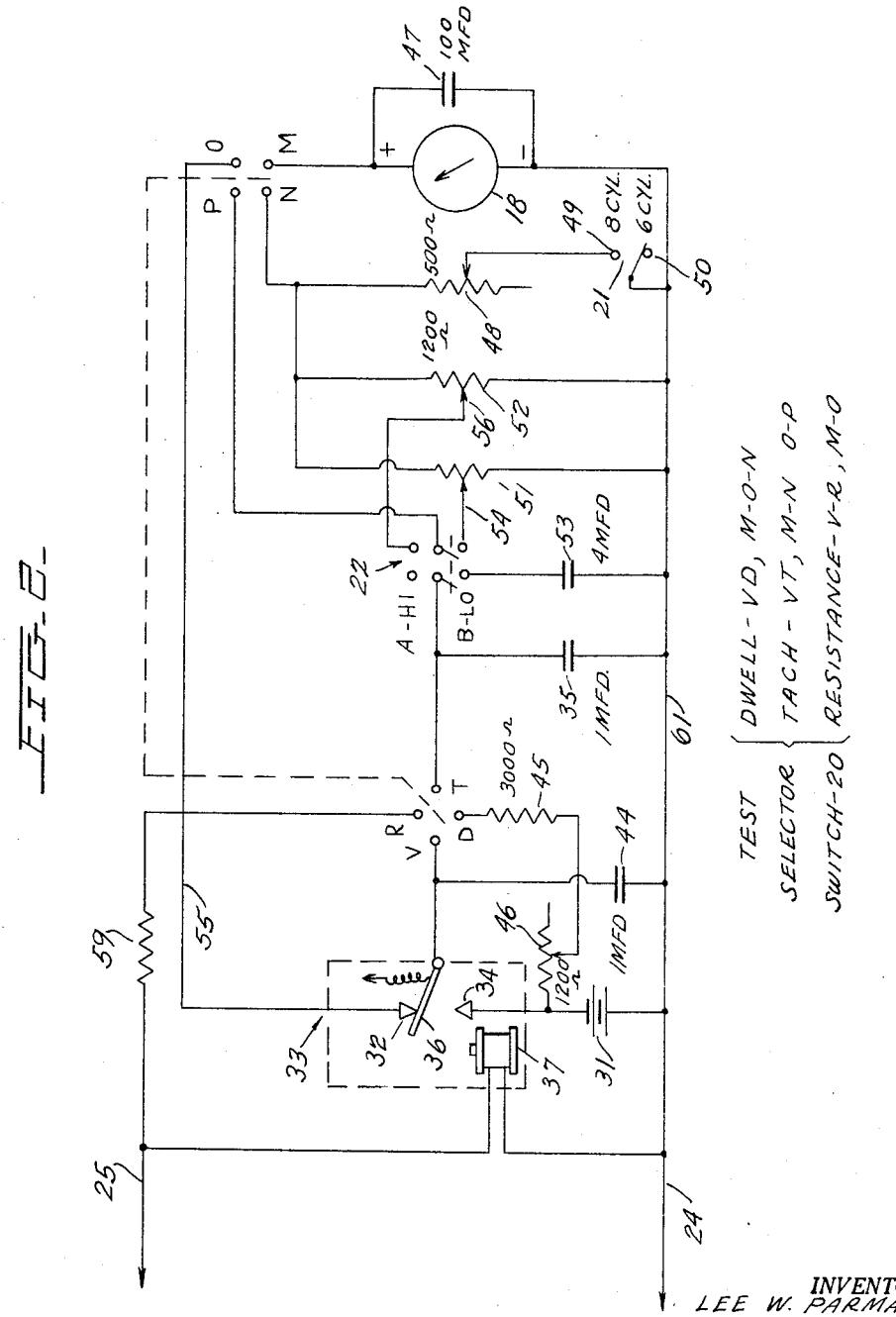

United States Patent Office 3,275,932
Patented Sept. 27, 1966

3,275,932
R.P.M. DWELL ANGLE AND POINT RESISTANCE TESTER
Lee W. Parmater, Plainwell, Mich., assignor to Kal-Equip Company, Inc., Otsego, Mich., a corporation of Michigan
Continuation of abandoned application Ser. No. 52,131, Aug. 26, 1960. This application May 11, 1965, Ser. No. 458,819
12 Claims. (Cl. 324—16)

This application is a continuation of application Serial No. 52,131 filed August 26, 1960, now abandoned. The invention set forth herein relates to testing devices for internal combustion engines and in particular relates to a tester having a novel arrangement for determining the dwell of the breaker points as well as being able to measure resistance of the breaker points and engine speed.

Heretofore it has not been found practical to construct an engine tester for measuring both breaker point dwell and engine speed since the circuitry involved for measuring each function has been vastly different. However, it is high desirable to provide a tester which will measure both functions since the tester leads are connected to the same points on the engine for both tests and both tests are made while the engine is running.

In the tester of this invention the circuitry for obtaining engine speed is substantially as illustrated in the Parmater et al. application, Serial No. 739,540, filed June 3, 1958, now abandoned, entitled, "Engine Speed Tester." The circuitry provided by the instant invention for testing point contact dwell utilizes many elements common to the circuitry for testing engine speed. That is, the meter for obtaining a visual indication, the local battery, and the operating relay are elements common to both test circuits.

The engine speed test circuitry is such that a condenser is charged whenever the breaker points of the engine are opened, and the condenser discharges through the meter when the contact points are closed.

The breaker point dwell angle testing circuit is such that the local battery discharges through the meter whenever the breaker points are closed. This is accomplished by connecting the normally closed contacts of the operating relay in series between the local battery and the meter.

The time during which the normally closed contacts of the operating relay are closed may initially be regarded as being related to the dwell of the contact points. However, certain corrections must be made to compensate for electrical and mechanical delays introduced by the circuit elements. That is, there is a mechanical time delay injected through the operation of the operating relay movable contact. At slow speeds the delay is all but negligible. However, as speed increases, the delay becomes proportionately larger with respect to the actual dwell so that the delay reaches significant proportions.

An electrical delay is introduced by the impedance of the operating relay coil, which delays the build-up of voltage thereacross. This delay is substantially constant for a wide range of engine speeds and is substantially smaller in magnitude than is the mechanical delay.

This invention corrects for the mechanical and electrical time delays by providing a condenser of low value, which is charged by the local battery during the interval when the contact points are open. When the contact points are closed and the local battery is being discharged through the meter, the condenser also discharges through the meter by an amount which is sufficient to correct for the above noted mechanical and electrical time delays, so that an accurate dwell angle reading is obtained.

In addition to the dwell angle and r.p.m. tests, the device of the instant invention is capable of testing breaker point resistance. The resistance test is made while the engine is not running and the points are closed. For this test the common operating relay is so arranged that if the ignition switch is closed and it is necessary to rotate the engine in order to close the points, during the interval when the points are open, the meter of the test device will not be subjected to voltage generated by the engine battery.

Accordingly, a primary object of this invention is to provide a test device which includes a novel arrangement for determining breaker point dwell angle.

Another object is to provide a novel tester device utilizing many common components for testing engine speed and breaker point dwell angle.

Still another object is to provide a test device as above noted in which the circuitry for the dwell angle test includes means to correct for errors which would otherwise be produced by mechanical and electrical time delays of other components in the circuit.

A further object is to provide a device for testing engine speed, dwell angle, and breaker point resistance, with the circuitry for performing the resistance test including means to prevent the meter of the device from accidentally being subjected to the voltage of the engine battery.

A still further object is to provide a device which includes a common battery, a common operating relay, and a common meter for performing an engine speed test, a test to determine dwell angle, and a test for determining breaker point resistance.

These as well as other objects of this invention shall become readily apparent after reading the following description of the accompanying drawings in which:

FIGURE 1 is a front elevation of a tester constructed in accordance with the teachings of the instant invention connected to an engine under test.

FIGURE 2 is an electrical schematic of the device of FIGURE 1.

FIGURE 3 is a simplified electrical schematic of a portion of FIGURE 2 utilized for the engine speed test.

FIGURE 4 is a simplified electrical schematic of a portion of FIGURE 2 utilized for the dwell angle test.

It is noted that in the schematics of FIGURES 3 and 4 even though the ignition points are shown open, the relay contacts are shown in the positions they will occupy prior to energization of the relay coil.

Now referring to the figures, and more particularly to FIGURE 1, tester 10 includes a handle portion 11 which is adapted to be gripped by one hand of the operator. At the upper end of handle portion 11 is a head 17 having meter 18, which is viewable through the transparent covering of head opening 19. The manual operating handles of three switches 20–22 are accessible for operation through appropriate apertures in handle 11.

Mode switch 20, as will be more fully explained hereinafter, is operable to a selected one of three positions for testing either dwell angle, engine speed or point resistance. Switch 21 is operable to two positions and is set to the left when a six cylinder engine is being tested and to the right when an eight cylinder engine is being tested. Switch 22 is movable between two positions, with the position B toward the right being for low engine speeds and the position A toward the left being for high engine speeds. The engine speed and dwell angle tests are conducted with the engine operating while the point resistance test is conducted with the engine stopped.

Cable 23, projecting from the bottom of handle 11, includes insulation covered leads 24, 25. Booted alligator clip 26 at the end of lead 24 is connected to a suitable ground 27 to the engine while booted alligator clip 29 at the free end of lead 25 is connected to the primary terminal 28 of distributor 30.

Now referring more particularly to FIGURE 3 which illustrates the basic components of FIGURE 2 arranged for determining engine speed. In this circuit, meter 18 is connected from the positive terminal of local battery 31 to one of the stationary contacts 32 of operating relay 33. The negative terminal of battery 31 is connected to the other stationary contact 34 of relay 33, while condenser 35 is connected between the positive terminal of battery 31 and the movable contact 36 of relay 33. Relay coil 37 is connected in parallel with the engine breaker points 38 by leads 24, 25.

Points 38 are part of a series circuit extending from the positive terminal of engine battery 39 to the negative terminal thereof. This circuit includes the primary winding 40 of the engine ignition coil as well as the key operated engine ignition switch 41.

With coil 37 of operating relay 33 deenergized, spring 42 brings movable contact 36 into engagement with stationary contact 32. This condition prevails when breaker points 38 are in engagement. When breaker points 38 separate, relay coil 37 is connected in electrical series with primary winding 40 across engine battery 39. This causes relay 33 to be energized operating movable contact 36 into engagement with stationary contact 34.

Thus, it is seen that when points 38 are parted, condenser 35 will be connected across local battery 31 for charging. Thereafter, when breaker points 38 become engaged, condenser 35 is connected across meter 18 and discharges therethrough. The number of discharge pulses delivered by condenser 35 through meter 18 is a function of engine speed. That is, the greater the engine speed, the greater will be the number of pulses delivered by condenser 35 and the greater will be the reading on meter 18.

Now referring more particularly to FIGURE 4 which illustrates the basic components of FIGURE 2 arranged for determining dwell angle. The fixed connection between common elements 18, 31 and 33 are as previously described in connection with FIGURE 3, as are the connections between relay 33 and the engine under test. The circuit of FIGURE 4 includes condenser 44 which is connected from the positive terminal of local battery 31 to the movable contact 36 of relay 33. Resistor 45 is connected from the negative terminal of battery 31 to movable contact 36.

In the absence of condenser 44 local battery 31 would discharge through meter 18 whenever relay coil 37 was deenergized, that is, whenever breaker points 38 were closed. Thus, the longer breaker points 38 are closed the greater will be the discharge of battery 31 through meter 18 and the higher will be the dwell angle reading, so it can be said that the discharge of battery 31 through meter 18 is related to dwell angle.

However, this reading would not be an accurate indication of dwell angle since there are electrical and mechanical delays attendant upon the operation of relay means 33. That is, there is an electrical delay caused by the inductance of coil 37 which delays current buildup therethrough each time breaker points 38 are parted. Mechanical delay is introduced by the finite time required for the operation of movable contact 36 between stationary contacts 32 and 34.

In order to correct for the errors which would be introduced by the above noted electrical and mechanical delays, condenser 44 is provided. During the intervals when breaker points 38 are open, causing relay 33 to be energized, contact 36 engages contact 34 so that condenser 44 is connected directly across local battery 31. Condenser 44 then assumes a charge which is transferred through meter 18 when relay 33 is deenergized. Thus, not only does battery 31 discharge through meter 18 but condenser 44 also discharge through meter 18, thereby compensating for time delays introduced through the operation of relay 33.

Resistor 45 limits the current flowing directly from battery 31 to meter 18. In the circuit of FIGURE 2, potentiometer 46 is connected in series between resistor 45 and battery 31 so that the magnitude of discharge current through meter 18 may be set to a predetermined value.

Now referring more particularly more particularly to FIGURE 2 which illustrates the entire circuitry of tester 10. High capacitance electrolytic condenser 47 shunts meter 18. A value of 150 mfd. at 6 volt rating was found suitable to average and smooth out the discharge pulses and present a steady reading on the scale of meter 18. A sensitive meter 18 is used in order to minimize the drain on local battery 31. The exemplary meter 18 has an impedance of 220 ohms and a full scale reading is obtained with 0.5 milliampere.

Adjustable resistor 48 is connectible across meter 18 by switch 21 when in the 8 cylinder position at contact 49. The position of the tap on rheostat 48 is preset as a factory calibration to reduce the reading sensitivity of meter 18 in order that the more numerous pulses from an 8 cylinder engine will produce a reading of the proper speed on the common scale of meter 18. The 6 cylinder setting of switch 21 is against open contact 50, so that rheostat 48 does not shunt meter 18.

At this time it is noted that even when switch 21 is in the 8 cylinder postion, rheostat 48 does not necessarily shunt meter 18. That is, there must also be a connection made by selector switch 20 between its terminals N and M before rheostat 48 can be connected across meter 18 by switch 21.

Two additional rheostats 51, 52 are also connectible in shunt with meter 18 through operation of test selector 20. Rheostat 51 is for the "Lo" input and rheostat 52 is for the "Hi" input. That is, switch 22 in the B position thereof connects condenser 53 in parallel with condenser 35 and also connects the movable arm 54 of rheostat 51 to terminal P of test selector 20. With test selector 20 in the TACH position a jumper connects terminals O and P and another jumper connects terminals V and T. This means that the parallel combination of condenser 35 and 53 discharges through conductor 55 which is connected to the movable arm 54 of rheostat at 51. The parallel condenser 53 is used in the "Lo" position due to the longer duration at the slower engine speeds of the pulses and condenser charging apparatus.

With switch 22 in the A or "Hi" position, the input to meter 18 comes through conductor 55 which is now tied directly to movable arm 56 of rheostat 52. It is noted that in the A position of switch 22 condenser 53 is disconnected from the circuit.

The jumper connections between contacts V, R, T, D, M, N, O, P of tester selector 20 for the various positions thereof are set forth below the circuit diagram of FIGURE 2. Thus, in the PT RES (resistance) position of switch 20 with relay coil 37 deenergized the input to meter 18 is from lead 25 through current limiting resistor 59, contacts R and V of switch 20, contacts 36, 32 of relay 33, conductor 55, contacts O and M of switch 20, to the positive terminal of meter 18. The negative terminal of meter 18 is connected to lead 24 by conductor 61.

Thus, it is seen that when a test is being conducted for point contact resistance, if the points are open the voltage of the engine battery will not be impressed upon meter 18, since at this time relay 33 will be energized. When this occurs relay contact 36 parts from relay contact 32 so that the circuit between relay contact 32 and switch contact V is broken.

As is apparent from FIGURE 2, cylinder switch 21 is a single pole device while r.p.m. scale switch 22 is a double pole double throw device. Test selector switch 20 is a multi-layer type switch whose operating handle is movable back and forth between three positions DWELL, TACH, and PT RES arranged in that order.

It is noted that a spring (not shown) is provided to operate the handle of switch 20 from DWELL to TACH after release of the handle. This insures that switch 20 will not accidentally be left in DWELL position. In DWELL position local battery 31 would continuously discharge directly through meter 18 if meter 10 were disconnected from the engine or if connected to a stopped engine with the breaker points closed.

Thus, this invention provides novel circuitry for determining dwell angle with this circuitry being combined in a tester with circuitry for determining point resistance and engine speed. The circuitry for all three tests utilizes many common components.

In the claims the term "local battery" means a battery forming part of the tester being claimed as distinguished from the battery of the engine ignition-starter system being tested. The terms "active" and "inactive" as used in the claims refer to whether or not an element is connected in circuit by mode switch 20 in a manner which enables such element to contribute to the visual indication. For example, when the DWELL test is being conducted condenser 44 is active since it acts to determine the indication seen on meter 18. However, during the TACH test condenser 44 does not act to determine the reading on meter 18 so that condenser 44 is said to be inactive. Since the same meter 18 is connected in circuit to respond during both the TACH and DWELL tests meter 18 is said to be "common" to both the TACH and DWELL test circuits.

Although the invention herein has been described in connection with an exemplary embodiment, it is to be understood that variations and modifications may be made therein without departing from the spirit and scope thereof, as defined in the following claims.

The embodiments of the invention in which an exclusive privilege or property is claimed are defined as follows:

1. Apparatus for measuring dwell angle of breaker points in an ignition system having a source of electrical energy connected in circuit with such breaker points; said apparatus including a relay means, an indicator, a capacitor means, a local battery, an impedance element and test lead means connectable across breaker points under test; said relay means including a first normally closed and a second normally open contact section and an operating coil which when energized opens said first contact section and closes said second contact section; said test lead means connected to said coil for energization of the latter by a source of electrical energy external of said apparatus and in circuit with breaker points under test when such breaker points are open and said test lead means are connected thereacross; circuit means including a first circuit for discharging said capacitor means through said indicator when said coil is deenergized; said first circuit including said first contact section; said circuit means also including a second circuit for discharging said local battery through said indicator when said coil is deenergized; said second circuit including said impedance element and being exclusive of said capacitor means with simultaneous discharges from both said capacitor means and said local battery contributing significantly to control operation of said indicator; a portion of said circuit means, including said second contact section, connecting said capacitor means to charge from energy supplied by said local battery when said coil is energized.

2. Apparatus as set forth in claim 1 in which a portion of said circuit means including said second contact section shorts said impedance element when said coil is energized.

3. Apparatus as set forth in claim 1 in which there is a circuit gap provided by said first contact section when said coil is energized; said circuit gap preventing discharges through said indicator from said local battery and said capacitor means when said coil is energized.

4. Apparatus as set forth in claim 3 in which said impedance element and said capacitor means are so proportioned that discharge of said local battery through said impedance element and said indicator is significantly larger than discharge of said storage device through said indicator.

5. Apparatus as set forth in claim 3 in which said impedance element is a resistor.

6. Testing apparatus connectable in a testing position across ignition system breaker points which are electrically connected in circuit with a source of electrical energy and driven by an engine connected to such ignition system so that frequency of breaker point operation is proportional to engine speed; said apparatus including a first circuit means, a second circuit means, a mode switch selectively operable to a first and a second position, a common indicator in both said first and said second circuit means; said switch when in said first position activating said first circuit means; said switch when in said second position activating said second circuit means; elements constituting said first circuit means operatively connected and proportioned whereby said indicator presents an output indicative of speed for an engine under test when said apparatus is in said testing position and said first circuit means is activated, elements constituting said second circuit means operatively connected and proportioned whereby said indicator presents an output indicative of breaker point dwell angle for an ignition system of an engine under test when said apparatus is in said testing position and said second circuit means is activated; a common local battery and a common relay means constituting elements of both said first and said second circuit means; said relay means including a first normally closed and a second normally open contact section and an operating coil which when energized opens said first contact section and closes said second contact section; test lead means for connecting said apparatus in said testing position; said test lead means connected to said coil for energization of the latter when said apparatus is in said testing position by a source of electrical energy external of said apparatus and in circuit with breaker points across said apparatus is connected; said first and said second circuit means each including capacitor means connected to be charged by said local battery through said second contact section when closed and to discharge through said indicator and said first contact section when the latter is closed; with said mode switch in said first position and said coil denergized said second contact section providing a gap in said second circuit means preventing discharge of said local battery through said indicator; said second circuit means also including an impedance means; with said mode switch in said second position and said coil deenergized said impedance means connected across a gap in said second circuit means provided by said second contact section with said local battery discharging through said indicator, said impedance means and said first contact section.

7. Apparatus as set forth in claim 6 in which a portion of said circuit means including said second contact section shorts said impedance means when said coil is energized and said mode switch is in said second position.

8. Apparatus as set forth in claim 6 in which there is a circuit gap provided by said first contact section when said coil is energized; said circuit gap preventing discharges through said indicator from said local battery and said capacitor means when said coil is energized.

9. Apparatus as set forth in claim 8 in which said impedance means is a resistor.

10. Apparatus as set forth in claim 8 in which said impedance means and said capacitor means of said second circuit means are so proportioned that with said mode switch in said second position discharge of said local battery through said impedance means and said indicator is significantly greater than discharge of said capacitor means of said second circuit means through said indicator.

11. Apparatus as set forth in claim 8 in which there is a biasing means urging said mode switch away from said second position.

12. Apparatus as set forth in claim 6 also including a third circuit means having said indicator therein; said switch further operable to a third position wherein said third circuit means is activated; elements constituting said third circuit means operatively connected and proportioned whereby said indicator presents an output indicative of breaker point resistance for an ignition system of an engine under test when said apparatus is in said testing position, said third circuit means is activated and an engine under test is stopped; said local battery and said relay means also constituting elements of said third circuit means; with said switch in said third position, said first contact section electrically connecting said test lead means across said indicator when said apparatus is in said testing position, and said coil is deenergized; with said switch in said third position said second contact section providing a gap in said third circuit means electrically disconnecting said test lead means from across said indicator and preventing discharge of said local battery through said indicator when said coil is energized.

References Cited by the Examiner
UNITED STATES PATENTS

| | | | |
|---|---|---|---|
| 2,056,416 | 9/1936 | Allen | 324—15 |
| 2,366,889 | 1/1945 | Westberg | 324—16 |
| 2,425,321 | 8/1947 | Horton | 324—16 |
| 3,056,084 | 9/1962 | Parmater | 324—70 |
| 3,095,536 | 6/1963 | Westberg | 324—70 |

WALTER L. CARLSON, *Primary Examiner.*

RICHARD B. WILKINSON, *Examiner.*

M. J. LYNCH, *Assistant Examiner.*